(12) United States Patent  
Ouchi (10) Patent No.: US 7,125,171 B2
(45) Date of Patent: Oct. 24, 2006

(54) BEARING UNIT FOR WHEEL DRIVE (75) Inventor: Hideo Ouchi, Fujisawa (JP)

(73) Assignee: NSK Ltd., Tokyo (JP)

( * ) Notice: Subject to any disclaimer, the term of this patent is extended or adjusted under 35 U.S.C. 154(b) by 147 days.

(21) Appl. No.: 11/012,240

(22) Filed: Dec. 16, 2004

(65) Prior Publication Data

US 2005/0094912 A1    May 5, 2005

Related U.S. Application Data

(62) Division of application No. 10/276,923, filed on Aug. 6, 2003, now Pat. No. 6,926,448.

(30) Foreign Application Priority Data

Sep. 29, 2000 (JP) ............................. 2000-298222
Oct. 6, 2000 (JP) ............................. 2000-307091

(51) Int. Cl.
*F16C 19/08* (2006.01)
(52) U.S. Cl. .................................................... 384/537
(58) Field of Classification Search ................ 384/537, 384/540, 544, 584, 589
See application file for complete search history.

(56) References Cited

U.S. PATENT DOCUMENTS 4,241,957 A    12/1980    Peck
5,209,701 A    5/1993    Ishikawa et al.
5,226,738 A    7/1993    Valette et al.
6,280,096 B1    8/2001    Miyazaki et al.
6,398,419 B1    6/2002    Kashiwagi et al.
6,422,758 B1    7/2002    Miyazaki et al.

FOREIGN PATENT DOCUMENTS

| EP | 0854303 | 7/1998 |
|---|---|---|
| EP | 0992698 | 4/2000 |
| EP | 1125765 | 8/2001 |
| JP | 2000110840 | 4/2000 |

*Primary Examiner*—Lenard A. Footland
(74) *Attorney, Agent, or Firm*—Crowell & Moring LLP (57) ABSTRACT

An inner race 5 is retained by a crimped portion 30, so that a pre-load is applied to rolling elements 6. A bearing unit for wheel support 1 is connected to a constant velocity joint 2 through tightening of a nut 24. By regulating the tightening force of the nut 24, at the area of contact between the inside end of the crimped portion 30 and the outside end of the outer ring of the constant velocity joint 14, the load per unit length is controlled up to 125 N/mm, or the surface pressure is controlled up to $1.5 \times 10^8$ Pa. Consequently, a bearing unit for wheel support is realized at a low cost with the pre-load securely applied, preventing unpleasant noise from occurring during operation, and preventing play due to plastic deformation.

1 Claim, 9 Drawing Sheets

Fig.10

BEARING UNIT FOR WHEEL DRIVE

This application is a division of Ser. No. 10/276,923, filed Aug. 6, 2003, now U.S. Pat. No. 6,926,448.

TECHNICAL FIELD OF THE INVENTION

This invention relates to a bearing unit for wheel drive, and more particularly to a bearing unit for wheel drive which integrates a bearing unit for supporting the wheels with a constant-velocity joint, and which is used for supporting the drive wheels that are supported by an independent suspension {front wheels of a FF vehicle (front engine and front-wheel drive vehicle), the rear wheels of a FR vehicle (front engine and rear-wheel drive vehicle), and all the wheels of a 4WD vehicle (four-wheel drive vehicle)} such that they rotate freely with respect to the suspension, as well as for rotating and driving the drive wheels.

BACKGROUND TECHNOLOGY OF THE INVENTION

Various kinds of bearing units for wheel support, which are constructed such that an outer race and inner race rotate freely by way of rolling elements, have been used in order to support wheels such that they can rotate freely with respect to the suspension.

Moreover, a bearing unit for supporting the drive wheels on the independent suspension, as well as for rotating and driving the drive wheels, is constructed by combining a bearing unit for supporting the wheels with a constant-velocity joint. This bearing unit for wheel drive must be able to transmit the rotation of the drive shaft to the wheels smoothly (securing constant velocity) regardless of the relative displacement between the differential gear and driven wheels and the steering angle applied to the wheels.

Figure 1:
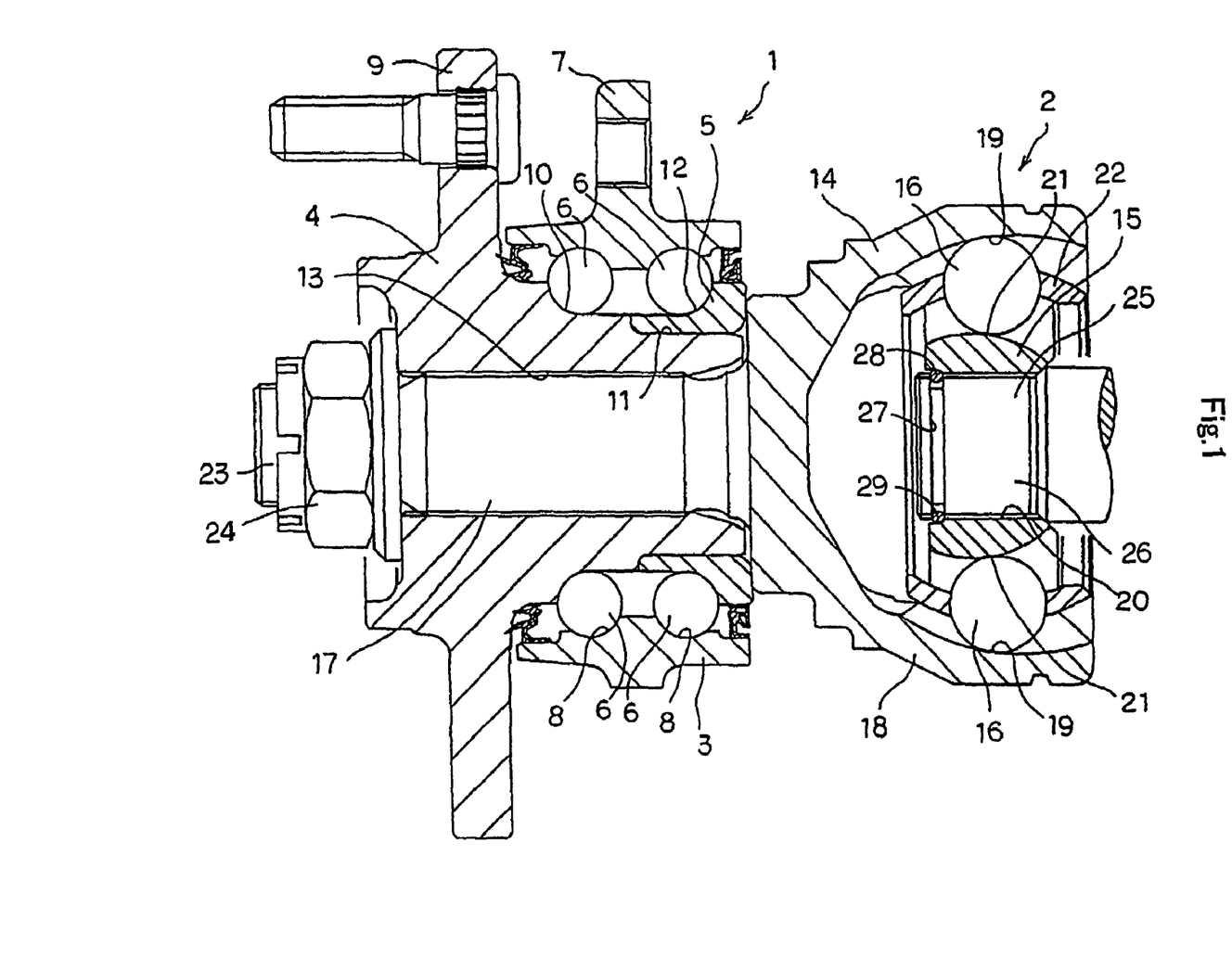
FIG. 1 is a cross sectional view to show a first example of the conventional structure.

FIG. 1 shows a typical bearing unit for wheel drive for this purpose that comprises a bearing unit 1 for wheel support and a constant-velocity joint 2.

In the bearing unit 1 for wheel support, a hub 4 and inner race 5 are supported on the radial inside of an outer race 3 by way of a plurality of rolling elements 6 such that they rotate freely. Of these, the outer race 3 is fastened to the knuckle (not shown in the figure) of the suspension by a first flange 7, which is formed around the outer peripheral surface of the outer race 3, such that it does not rotate even during use. In addition, a pair of outer-ring raceways 8 are formed around the inner peripheral surface of the outer race 3, the hub 4 and inner race 5 are supported on the radial inside of this outer race 3 such that they are concentric with the outer race 3 and such that they rotate freely.

A second flange 9 for supporting the wheel is formed around the outer peripheral surface of the hub 4 at a portion near the outside end thereof (the outside is the side which is on the outside in the width direction of the vehicle when the bearing unit is installed in the vehicle, and in the figures that show the bearing unit for wheel support, including FIG. 1, it is on the left side). Also, a first inner-ring raceway 10 is formed around the outer peripheral surface in the middle of the hub 4, and a small-diameter stepped section 11 is formed around the outer peripheral surface on the inside end of the hub 4 (the inside is the side which is on the center in the width direction of the vehicle when the bearing unit is installed in the vehicle, and in the figures that show the bearing unit for wheel support, including FIG. 1, it is on the right side), and the inner race 5 is fitted around the small-diameter stepped section 11 and fastened to this small-diameter stepped section 11 and a second inner-ring raceway 12 is formed around the outer peripheral surface of the inner race 5. In addition, a first spline hole 13 is formed in the center of the hub 4.

On the other hand, the constant-velocity joint 2 comprises an outer ring 14 for the constant-velocity joint, an inner ring 15 for the constant-velocity joint, a plurality of balls 16 and a spline shaft 17.

The outer ring 14 for the constant-velocity joint and the spline shaft 17 form a drive-shaft member 18. In other words, this spline shaft 17 is formed on the outer half of the drive-shaft member 18, and it is fitted in the spline hole 13, while the outer ring 14 for the constant-velocity joint is formed on the inner half of the drive-shaft member 18. Outside engagement grooves 19 are formed at a plurality of locations in the circumferential direction around the inner peripheral surface of the outer ring 14 for the constant-velocity joint, such that the outside engagement grooves 19 are orthogonal to this circumferential direction.

Moreover, a second spline hole 20 is formed in the center of the inner ring 15 for the constant-velocity joint, and the inside engagement grooves 21 are formed around the outer peripheral surface of the inner ring 15 in alignment with the outside engagement grooves 19, and orthogonal with respect to the circumferential direction.

The aforementioned balls 16 are held between the inside engagement grooves 21 and the outside engagement grooves 19 by a retainer 22 such that they roll freely along the engagement grooves 21, 19.

The shape of the components of the constant-velocity joint 2 are the same as those for the well known Rzeppa-type or Barfield-type constant-velocity joint, and are not related to this invention so a detailed explanation of them is omitted.

For the constant-velocity joint 2 described above and this kind of rolling bearing unit 1 for wheel support, the spline shaft 17 is inserted into the spline hole 13 from the inside toward the outside. Also, on the outside end of the spline shaft 17, a nut 24 screws onto a male screw section 23 that is formed on the part that protrudes from the outside end of the hub 4, and by tightening this nut 24, the spline shaft 17 and hub 4 are fastened together. In this state, the inside end surface of the inner race 5 comes in contact with the outside end surface of the outer ring 14 for the constant-velocity joint, so the inner race 5 does not move in a direction such that it would come apart from the small-diameter stepped section 11. At the same time, adequate pre-stressing is applied to the rolling elements 6.

Furthermore, when assembled with the suspension of the vehicle, the male spline section 26 that is formed on the outside end of the drive shaft 25 is fitted in the second spline hole 20 that is formed in the center of the inner ring 15 for the constant-velocity joint.

Also, the snap ring 28 that is fitted in the attachment groove 27 that is formed all the way around the outer peripheral surface on the outside end of the male spline 26 is engaged with the stepped section 29 that is formed around the edge of the opening on the outside end of the second spline hole 20 to prevent the male spline section 26 from coming out from the second spline hole 20.

The inside end of the drive shaft 25 is fastened to the center of the trunnion of a tripod-type constant-velocity joint (not shown in the figure) that is formed on the output shaft of the differential gear (not shown in the figure). Accordingly, the drive shaft 25 rotates at constant velocity when the vehicle is running.

In the case of the bearing unit for wheel drive shown in FIG. 1, the force that presses the inner race 5 so as to apply a pre-load to the rolling elements 6 that are located between the first and second inner-ring raceways 10, 12 and each of the outer-ring raceways 8, is obtained by screwing the nut 24 onto the male screw section 23 and tightening it. Therefore, it is necessary to tighten the nut 24 very tightly to secure the-pressure force of the inner race 5.

The size of the shaft force that occurs in the spline shaft 17 and that presses the outside end surface of the outer ring 14 of the constant-velocity joint against the inside end surface of the inner race 5 by tightening the nut 24 on the male screw section 23 is substantially large and depends on the size of the bearing unit for wheel drive, such that it is about $(4 \text{ to } 9) \times 10^4$ N for a normal passenger car.

Due to this large shaft force, surface pressure is applied to the area of contact between the inside end surface of the inner race 5 and the outside end surface of the outer ring 14 of the constant-velocity joint, however, both of these end surfaces are a planar surface that exists in a direction perpendicular to the center axis, and therefore come in contact over a wide area with each other. Therefore, neither of the end surfaces have plastic deformation at the area of contact.

Figure 2:
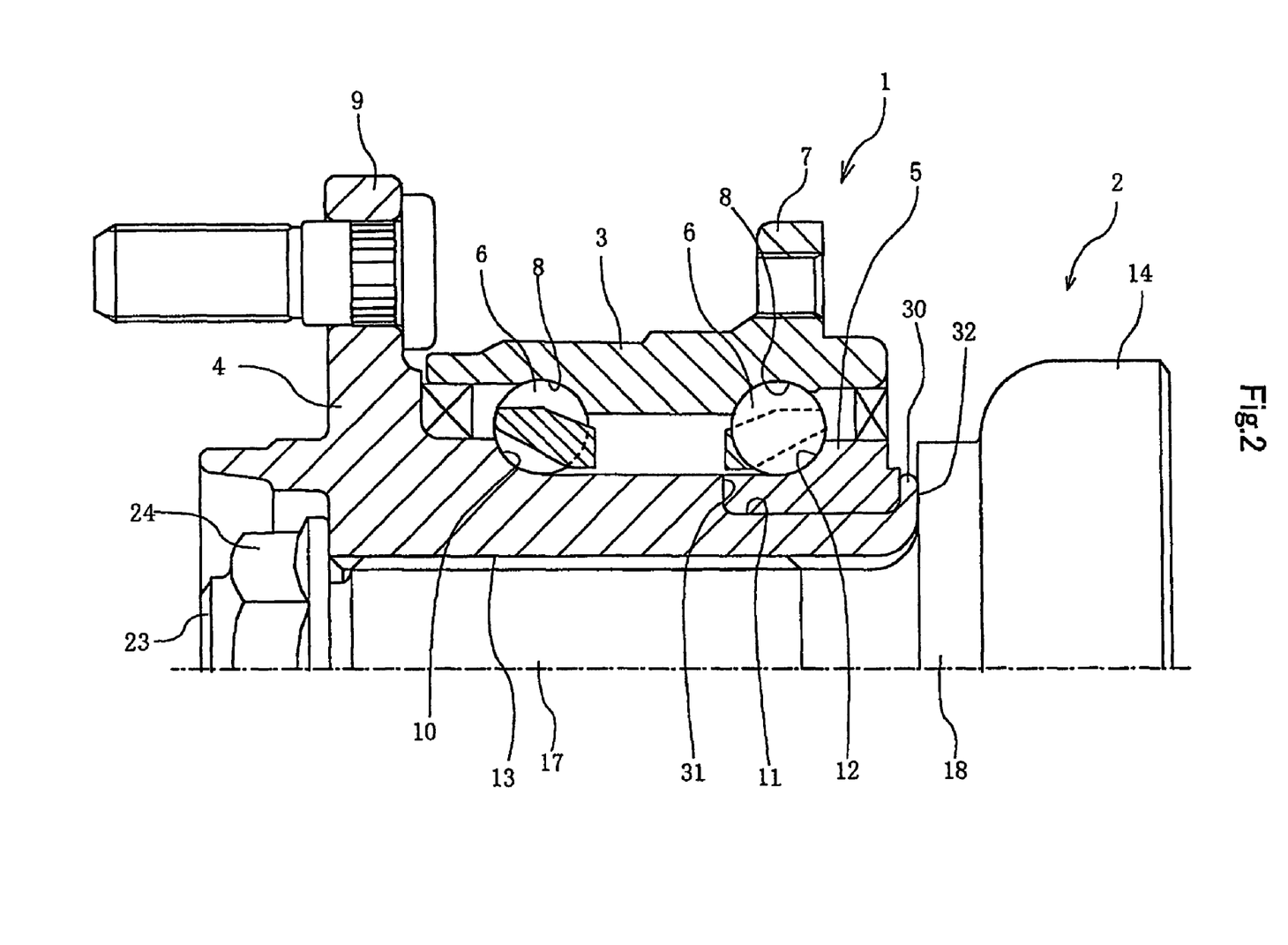
FIG. 2 is a cross sectional view to show one half of a second example of the conventional structure.

Moreover, with the construction disclosed in Japanese Patent Publication No. Tokukai Hei 11-5404, and as shown in FIG. 2, the cylindrical section existing on the inside end of the hub 4 at a portion that protrudes inward beyond the inner race 5 that is fitted over the small-diameter stepped section 11 forms a crimped section 30 that is deformed outward in the radial direction, and the inner race 5 is retained toward the stepped surface 31 of the small-diameter stepped section 11 by this crimped section 30. In the case of this second example of prior construction, a pre-load is applied to the rolling elements 6 by the retaining force of the crimped section 30. Similar to the first example of prior construction described above, the connection between the bearing unit 1 for supporting the wheels and the constant-velocity joint 2 is obtained by screwing-the nut 24 onto the male screw section 23 that is formed on the outside end of the spline shaft 17 and tightening it. When this nut 24 is tightened, the flat surface 32 that is formed on the inner surface of the crimped section 30 comes in contact with the surface on the outside end of the outer ring 14 of the constant-velocity joint. In the case of this second example of prior construction as well, the aforementioned flat surface 32 is formed such that shaft force that occurs in the spline shaft 17 when the nut 24 is screwed onto the male screw section 23 and tightened can become large as in the case of the first example of prior construction.

With the bearing unit for wheel drive as shown in FIG. 1 and as described above, an unpleasant rubbing noise of squeal sometimes occurred when the vehicles was moving. The occurrence of this unpleasant noise is known to be caused when the area of contact between the surface on the inside end of the inner race 5 and the surface on the outside end of the outer ring 14 of the constant-velocity joint rub due to fluctuations in torque that is transmitted between the constant-velocity joint 2 and the bearing unit 1 for supporting the wheel. In other words, the torque changes frequently due to repeated acceleration and deceleration. Moreover, the spline shaft 17 that is formed on the side of the constant-velocity joint 2 elastically deforms in the twisting direction as torque is transmitted between the constant-velocity joint 2 and bearing unit 1 for wheel support, and the amount of deformation tends to change frequently as the torque fluctuates.

Also, as the force, which causes the spline shaft 17 to deform in the twisting direction, or the force, which tries to return the twisted spline shaft 17 to the original position, becomes larger than friction acting on the area of contact, minute slipping occurs at this area of contact. In this case, as the friction force acting on the area of contact becomes large, the rubbing energy between the surface on the inside end of the inner race 5 and the surface on the outside end of the outer ring 14 of the constant-velocity joint becomes large due to the slipping, and cause an unpleasant noise.

In order to prevent the occurrence of this kind of unpleasant noise, a film for reducing the friction was formed using grease, molybdenum disulfide, fluorine resin, or the like, on the area of contact between the surface on the inside end of the inner race 5 and the surface on the outside end of the outer ring 14 of the constant-velocity joint. By making the area of contact slippery, it is possible to keep the rubbing energy between the surface on the inside end of the inner race 5 and the surface on the outside end of the outer ring 14 of the constant-velocity joint small even when minute slipping occurs, and thus it is possible to make it difficult for the unpleasant noise to occur.

It is known that this kind of method is somewhat effective. However, the film for reducing the friction is not always durable enough, and it is difficult to maintain sufficient effect over a long period of time. Particularly, with construction of not sealing the contact area with a seal ring, the period of time that the unpleasant noise can be effectively reduced is limited.

It is also thought that in order to reduce the friction, the tightening force on the nut 24 can be loosened to reduce the surface pressure between the surface on the inside end of the inner race 5 and the surface on the outside end of the outer ring 14 of the constant-velocity joint. However, in the case of the first example of prior art construction shown in FIG. 1, a pre-load is applied to the rolling elements 6 due to the tightening force of the nut 24, so application of this method is difficult. In the case of the second example shown in FIG. 2 as well, increasing the tightening force of the nut 24 as in the case of the first example is considered, so it is not possible to suppress the occurrence of the unpleasant noise.

Furthermore, in the case of the first example of prior art construction shown in FIG. 1, the tightening force of the nut 24 with respect to the male screw section 23 is increased in order to apply a pre-load, so a large axial force occurs in the spline shaft 17. Therefore, the torque required for tightening the nut 24 becomes large, and it is not possible to avoid decrease in work efficiency of assembling the bearing unit for wheel drive.

Taking into consideration that the same axial force that occurred in the first example also occurs in the second example of prior art construction shown in FIG. 2, a large flat surface 32 is formed on the surface of the inside end of the crimped section 30, and therefore, the same problem occurs. Moreover, in the case of the second example shown in FIG. 2, the cost increases due to the work of tightening the nut 24 with a large torque.

DISCLOSURE OF THE INVENTION

Taking the above problems into consideration, an objective of this invention is to provide a bearing unit for wheel drive that is constructed so that the unpleasant rubbing noise of squeal can be effectively prevented over a long period of time.

Moreover, taking the above problems into consideration, another objective of this invention is to provide a bearing unit for wheel drive which can be constructed at low cost and still be capable of sufficient pre-loading of the rolling elements even when the torque for tightening the nut is reduced.

The bearing unit for wheel drive of this invention comprises: a drive shaft member on which an outer ring of a constant-velocity joint is formed on the inside half, and a spline shaft is formed on the outside half; a hub with a spline hole formed in the center in which the spline shaft is fitted, and which is rotated and driven via the constant-velocity joint during use due to the engagement between the spline hole and spline shaft; a flange that is formed around the outer peripheral surface on the outside end of the hub for supporting and fastening a wheel to the hub; a first inner-ring raceway that is formed directly around the outer peripheral surface in middle of the hub or by way of an inner race that is separate from the hub; a small-diameter stepped section that is formed at the inside end of the hub such that the dimension of its outer diameter is smaller than the section that is formed with the first inner-ring raceway; an inner race that has a second inner-ring raceway formed around the outer peripheral surface thereof and that is fitted around the small-diameter stepped section; an outer race that has a pair of outer-ring raceways formed around the inner peripheral surface thereof such that they face the aforementioned first and second inner-ring raceways, and which is not rotated even during use; and a plurality of rolling elements that are located between each of the outer-ring raceways and the first and second inner-ring raceways.

A cylindrical section is located on the section of the inside end of the hub that protrudes further inward than the inner race that is fitted around the small-diameter stepped section, and a crimped section, which is crimped outward in the radial direction, is formed on the cylindrical section such that this crimped section retains the inner race against the surface of the step of small-diameter stepped section, and the inner race is fastened to the hub with a pre-load applied to the rolling elements.

A nut is screwed onto a male thread portion provided on the tip end of the aforementioned drive-shaft member, and the surface on the outside end of the hub comes in contact with the surface of the inside end of the nut, and the drive shaft member and the hub are connected to each other by tightening the nut with the surface on the inside end of the crimped section being in contact with the surface on the outside end of the outer ring of the constant-velocity joint.

Moreover, a feature of the present invention is that a flat surface is formed on the surface of the inside end of the crimped section such that the average value of the surface pressure at the area of contact between the surface on the inside end of the crimped portion and the surface on the outside end of the outer ring of the constant-velocity joint is $1.5 \times 10^8$ Pa or less.

Another feature of the present invention is that the contact between the surface on the inside end of the crimped section and the surface on the outside end of the outer ring of the constant-velocity joint is line contact, and the load per unit length $F/L_a$ that is obtained by dividing the axial force F, which is applied to the spline shaft when tightening the nut, by the circumferential length $L_a$ around the average diameter of the area of contact between the surface on the inside end of the crimped section and the surface on the outside end of the constant-velocity joint, is 125 N/mm or less.

DESCRIPTION OF THE PREFERRED EMBODIMENT TO WORK THE INVENTION

Similar to the second example of prior art construction shown in FIG. 2, the bearing unit for wheel drive of a first embodiment of the invention comprises a drive-shaft member, hub, flange, first inner-ring raceway, small-diameter stepped section, inner race, outer race and rolling elements.

On the inside half of the drive-shaft member there is an outer ring for the constant-velocity joint, and on the outside half there is a spline shaft.

Also, a spline hole is formed in the center of the hub in which the spline shaft is fitted, such that the hub is rotated and driven by way of the constant-velocity joint during use.

In addition, the flange is formed around the outer peripheral surface on the outside end of the hub in order to support and fasten the wheel to the hub.

Moreover, the first inner-ring raceway is formed directly around the outer peripheral surface in the middle of the hub, or by way of another inner race that is separate from the hub.

Also, the small-diameter stepped section is formed on the inside end of the hub such that the dimension of its outer diameter is less than that of the section formed with the first inner-ring raceway.

In addition, the inner race has a second inner-ring raceway formed around the outer peripheral surface thereof, and is fitted over the small-diameter stepped section.

Moreover, the outer race has a pair of outer-ring raceways formed around the inner peripheral surface thereof such that they face the first and second inner-ring raceways, and it does not rotate during use.

Also, the rolling elements are arranged such that a plurality of rolling elements are located between each of the outer-ring raceways and the first and second inner-ring raceways.

In addition, a cylindrical section exists on the section of the inside end of the hub that protrudes further inward than the inner race that is fitted over the small-diameter stepped section, and a crimped section that is crimped outward in the radial direction is formed on the cylindrical section. This crimped section retains the inner race against the surface of the step of the small-diameter stepped section, and the inner race is fastened to the hub with a pre-load applied to the rolling elements.

Moreover, the surface of the outside end of the hub comes in contact with the surface of the inside end of the nut that screws onto a male thread portion provided on the tip end of the drive-shaft member, and the hub is fastened to the drive-shaft member by tightening the nut with the surface of the inside end of the crimped section being in contact with the surface of the outside end of the outer ring of the constant-velocity joint.

In the bearing unit for wheel support, a flat surface is formed on the surface of the inside end of the crimped section, and preferably the average surface pressure at the area of contact between the surface on the inside end of the crimped section and the surface on the outside end of the outer ring of the constant-velocity joint should be $1.5 \times 18^8$ Pa or less, and more preferably $1.0 \times 10^8$ Pa or less. With the bearing unit for wheel drive of this invention, constructed as described above, the surface pressure at the area of contact between the surface on the inside end of the crimped section and the surface on the outside end of the outer ring of the constant-velocity joint is kept low, so it is possible to keep the friction energy between the inside end surface and the outside end surface small, and thus it is possible to prevent the unpleasant noise from occurring. Also, unlike in the case of forming a film for reducing the friction, it is possible to prevent the noise from occurring for a long period of time.

The aforementioned cylindrical section is not a perfect cylindrical shape in order that the crimping process can be performed easily, but it is preferable that at least one of the surfaces, the inner surface or outer surface, is tapered, such that the thickness in the radial direction becomes smaller going toward the inside end.

Moreover, unlike the second example of prior art construction as shown in FIG. 2, in a second embodiment of the present invention, there is no flat surface formed on the surface of the inside end of the crimped section, and it is preferable that the cross-sectional shape of the crimped section be left as is with a convex circular arch shape, such that there is line contact between the surface on the inside end of the crimped section and the surface on the outside end of the outer ring of the constant-velocity joint.

Also, in the bearing unit for wheel support of this invention, it is preferable that the load per unit length $F/L_a$ that is obtained by dividing the axial force F, which is applied to the spline shaft when the nut is tightened, by the circumferential length $L_a$ around the average diameter of the contact area between the surface on the inside end of the crimped section and the surface on the outside end of the outer ring of the constant-velocity joint, be 125 N/mm or less. The value of this load per unit length $F/L_a$ is particularly effective when the cross-sectional shape of the surface on the inside end of the crimped section is a convex circular arc shape with a radius of curvature of 5 mm or more, and the surface on the outside end of the outer ring of the constant-velocity joint is a flat surface. With the bearing unit for wheel drive of this invention, constructed as described above, the load per unit length $F/L_a$ at the area of contact between the surface on the inside end of the crimped section and the surface on the outside end of the outer ring of the constant-velocity joint is kept low, so there is no plastic deformation of either of the end surfaces mentioned above, even when the surface on the inside end of the crimped section is not a flat surface. Moreover, the pre-loading of the rolling elements is performed by retaining the surface on the inside end of the inner race with the crimped section that is formed on the inside end of the hub, so even when the tightening force of the nut is reduced in order to make the load per unit length $F/L_a$ smaller, there is no displacement of the inner race with respect to the hub in the direction that the inner race comes apart from the small-diameter stepped section, and thus pre-loading can be performed effectively.

Next, the reason why it is possible to prevent plastic deformation of both end surfaces mentioned above by keeping the load per unit length $F/L_a$ at 125 N/mm or less will be explained with reference to FIG. 7.

The radius of curvature $R_{30}$ of the cross-sectional shape of the virtually flat surface of the crimped section 30 that is formed on the inside end of the hub 4, which includes the center axis of the hub 4, so as to support the surface on the inside end of the inner race 5, is 5 mm or more. The reason for this is, that when the work for forming the crimped section 30 on the inside end of the steel hub 4 is performed using inexpensive cold forging, damage such as cracking occurs due to the processing work when the radius of curvature $R_{30}$ is small. In other words, in order to form a crimped section 30 with no damage due to cold forging, the radius of curvature $R_{30}$ must be kept at 5 mm or greater.

The cross-sectional shape of the crimped section 30 is not just a simple circular arc, but is a complex curved surface of a plurality of curved surfaces having different radii of curvature, and the section for which the radius of curvature $R_{30}$ must be kept at 5 mm or more is the section that protrudes inward the most and comes in contact with the surface on the outside end of the outer ring 14 of the constant-velocity joint.

On the other hand, of the crimped section 30, the minimum value of surface hardness of the inside end that comes in contact with the surface on the outside end of the outer ring 14 of the constant-velocity joint, is about Hv 300. In other words, the inside end of the hub 4, on which the crimped section 30 is formed based on the plastic deformation due to cold forging, cannot be made too hard in order that plastic deformation occurs easily (by a comparatively small force such that damage due to cracking does not occur).

Accordingly, when taking into consideration differences in product quality due to workmanship during processing and work-hardening due to the crimping process based on cold forging, the minimum value of the hardness of the inside end of the crimped section 30 is about Hv 300.

On the other hand, when the minimum value of the surface hardness of the inside end is kept at Hv 300 or greater, it becomes easy for damage to the crimped section 30 due to cracking to occur, and so this cannot be applied. Also, quench hardening after the crimped section 30 has been processed would be difficult to employ when considering the adverse effect that it has on the neighboring inner race 5 and increased processing cost.

Therefore, the minimum value of the surface hardness of the inside end of the crimped section 30 is about Hv 300.

Furthermore, the allowable stress of the steel used for the hub 4, or in other words, the difficulty of plastic deformation, is determined by the surface hardness. As the value of the surface hardness increases, the allowable stress increases, or in other words, plastic deformation becomes more difficult. The allowable stress for a surface hardness of Hv 300 is about 950 Mpa.

Also, when two cylinders come in contact with each other, the maximum surface pressure Pmax on the contact surface can be found from the well known Hertz equation, or equation (1) shown below.

[Equation 1]

$$P_{max} = \sqrt{\frac{E}{\pi\left(1 - \frac{1}{m^2}\right)} \cdot \frac{\Sigma\rho}{2} \cdot \frac{F}{L_a}} \qquad (1)$$

The meaning of the symbols in Equation (1) is as follows:

E: Modulus of Longitudinal elasticity

The hub 4 and outer ring 14 of the constant-velocity joint of the bearing unit for wheel drive are both made of steel, so the modulus of longitudinal elasticity is 206,000 MPa.

m: Poisson's number

For steel the Poisson's number is 10/3.

$\Sigma\rho$: Sum of the curvature of the two cylinders ($1/R_1$, $1/R_2$) ($=1/R_1+1/R_2$)

Of the symbols $R_1$ and $R_2$ in this equation, $R_1$ is equal to the radius of curvature $R_{30}$ of the cross-sectional shape of the crimped section 30, and this radius of curvature $R_{30}$ is 5 mm as described above. Also, $R_2$ is equal to the radius of curvature of the cross-sectional shape of the surface on the outside end of the outer ring 14 of the constant-velocity joint, and $R_2=\infty$, and $1/R_2=0$.

F: Load applied in the direction normal to the two cylinders [N]

The axial load applied to the spline shaft 17.

$L_a$: Circumferential contact length of the two cylinders [m]

When the average diameter of the contact area is taken to be D, $L_a=\pi D$.

The values determined for the bearing unit for wheel drive are entered into Equation (1), and in order that the surface pressure on the contact surface is up to the allowable stress, Equation (2) as shown below is obtained.

[Equation 2] (2)

$$\sqrt{\frac{206{,}000\times 10^6}{\pi\left(1-\frac{1}{\left(\frac{10}{3}\right)^2}\right)}\cdot\frac{0.2\times 10^3}{2}\cdot\frac{F}{L_a}} \leq 950\times 10^6$$

By solving Equation (2) above to find the load per unit length F/La, $F/L_a \leq 1.25\times 10^5$ [N/m]=125 [N/mm]

As can be seen from this result, by regulating the tightening force of the nut that is screwed on the male screw section that is formed on the outside end of the spline shaft in order to keep the load per unit length $F/L_a$ at 125 N/mm or less, there is no plastic deformation of the inside end of the crimped section 30 and the surface on the outside end of the outer ring 14 of the constant-velocity joint when the nut is tightened, and thus the nut does not become loose due to plastic deformation.

The calculation above was performed when the radius of curvature $R_{30}$ of the cross-sectional shape of the inside end of the crimped section 30 was taken to be 5 mm. However, normally, the crimped section 30 is processed such that this radius of curvature $R_{30}$ is at least 5 mm. As long as the load per unit length $F/L_a$ is 125 [N/mm] or less, then the surface pressure on the contact area does not exceed the allowable stress of the inside end of the crimped section 30 or of the surface on the outside end of the outer ring 14 of the constant-velocity joint.

Moreover, there is a relational expression between the torque at which the nut is tightened and the axial force that occurs in the spline shaft 17 due to the tightening of the nut, so when assembling the bearing unit for wheel drive, the torque is controlled, however the axial force is not directly controlled.

The preferred embodiments of the invention will be further explained with reference to the drawings. Here, the same codes will be used for identical sections.

Figure 3:
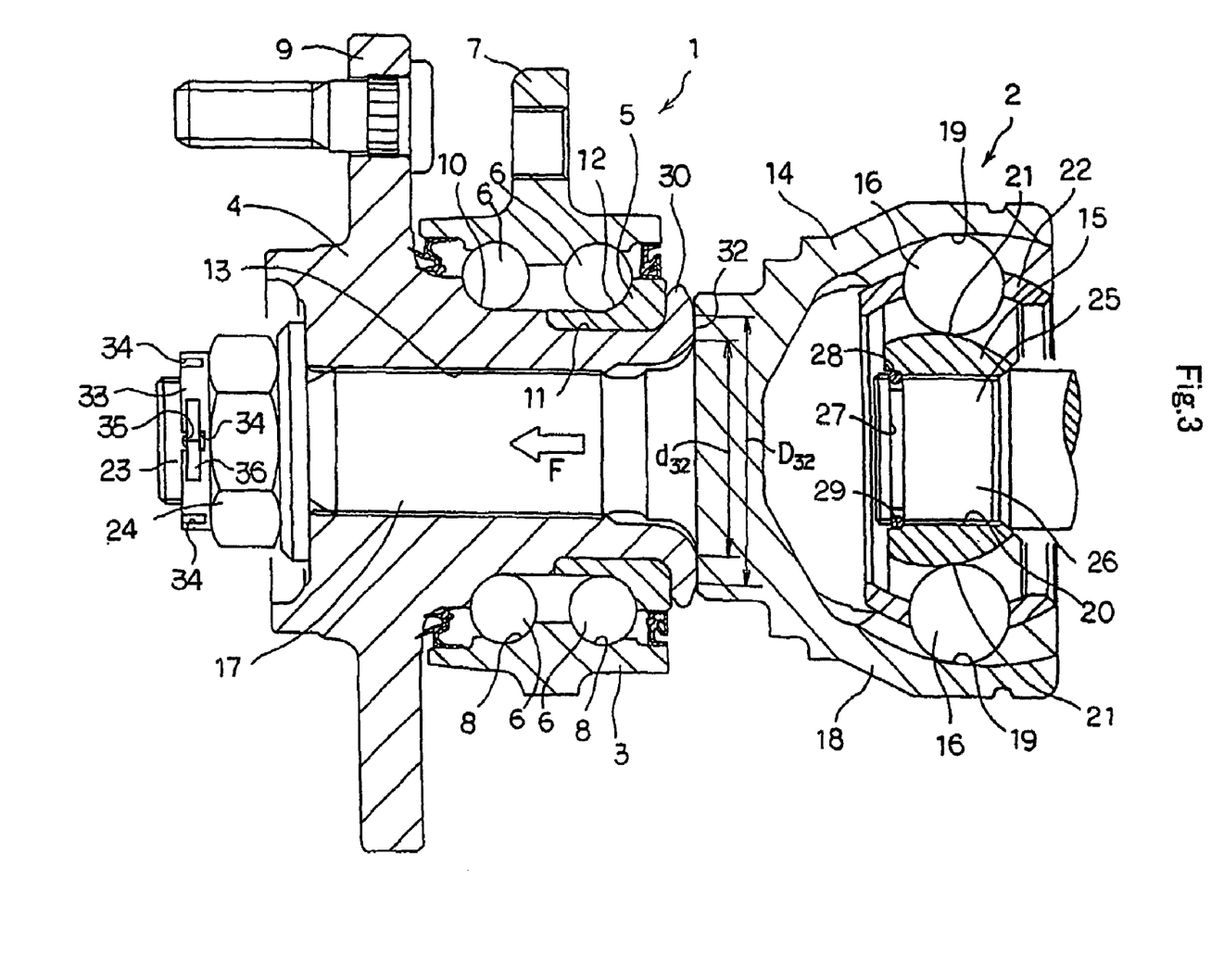
FIG. 3 is a cross sectional view to show a first example of the embodiment of the present invention.

FIG. 3 shows a first example of a first embodiment of the invention. A feature of the present invention is that it is possible to prevent unpleasant rubbing noise of squeal from occurring during operation, in the constructions where the inner ring 5 that is fitted over the small-diameter stepped section 11 formed on the inside end of the hub 4 is fastened to the small-diameter stepped section 11 by a crimped section 30 that is formed on the inside end of the hub 4, while a suitable pre-load is applied to the rolling elements 6. The construction of the fastened section of the inner race 5 is the same as that of the second example of prior art construction shown in FIG. 2, and the construction of all other sections is the same as that of the first example of prior art construction shown in FIG. 1, so any redundant explanation will be omitted or simplified, and this explanation will center only on the features of this invention and sections that are different from the prior art constructions previously described.

The female spline, which is formed around the inner peripheral surface of the spline hole 13 that is formed in the center of the hub 4, is a so-called parallel spline, and is formed such that each of the spline teeth is parallel with the center axis of the hub 4. In contrast, the male spline, which is formed around the outer peripheral surface of the spline shaft 17 on the outside half of the drive-shaft member 18, is a so-called twisted spline, and is formed such that the direction of the spline teeth is inclined a little with respect to the direction of the center axis of the drive-shaft member 18.

When the spline shaft 17 is pressed inside the spline hole 13 such in order to combine the bearing unit 1 for wheel support with the constant-velocity joint 2, the spline shaft 17 and spline hole 13 are fitted together with a spline fit with no play in the direction of rotation.

Also, a cylindrical section 33 is formed on the surface of the outside end of the nut 24, which screws onto the male screw section 23 that is formed on the outside end of the spline shaft 17, and notches 34 are formed at an even number of location around this cylindrical section 33 (6 locations in the example shown in the figure) such that they are evenly spaced around in the circumferential direction.

On the other hand, a through-hole 35 is formed in the outside end of the male screw section 23 in the section that matches with the notches 34 when the nut 24 is screwed and tightened such that it passes through the male screw section 23 in the radial direction.

Figure 4:
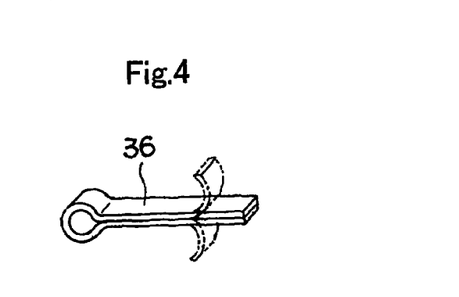
FIG. 4 is a perspective view of a cotter pin.

Also, when the nut 24 is screwed onto the male screw section 23 and tightened the required amount, a split cotter pin 36 is inserted through the through-hole 35 and the pair of notches 34 that are lined up with the openings on both ends of the through-hole 35, as shown in FIG. 4.

The tip end of this split cotter pin 36 (the front end in FIG. 3, and the right end in FIG. 4), is spread open through crimping as shown by the dashed line in FIG. 4, such that it cannot come out from the through-hole 35 and notches 34. With this construction, the nut 24 is fixed in place with the specified tightening.

The tightening force (tightening torque) of this nut 24 is regulated by the relationship with the surface area S of the flat surface 32 that is formed on the surface of the inside end of the crimped section 30 such that the average value of the surface pressure at the area of contact between the flat surface 32 and the surface on the outside end of the outer ring 14 of the constant-velocity joint is up to $1.5\times 10^8$ Pa ($\approx$15 kgf/mm$^2$). In this example, the outer diameter $D_{32}$ of the flat surface 32 is 51 mm, the inner diameter $d_{32}$ is 47 mm, and the tightening force of the nut 24 is kept such that the axial force F that is applied to the spline shaft 17 by tightening the nut 24 is 40 KN ($\approx$4 tf) or less.

Under the conditions above, the average value of the surface pressure $P_{av}$ at the area of contact between the both end surfaces is found as follows.

$$P_{av} = F/S = (40 \times 10^3)/\{\pi(0.051^2 - 0.047^2)/4\}$$
$$\approx 1.3 \times 10^8 \text{ [Pa]}$$

In this example, the surface pressure at the area of contact between the surfaces on both ends is kept at 1.5×10$^8$ Pa or less, so it is possible to suppress the unpleasant rubbing noise of squeal that occurs at this area of contact during operation.

In other words, since the surface pressure at the area of contact is kept low, it is possible to keep the rubbing energy between both of these surfaces low, and to prevent this kind of noise from occurring between these end surfaces, or keep it low enough such that it is not unpleasant, even when there is rubbing between both of the end surfaces due to twisting deformation of the spline shaft 17 during operation.

Next, testing that was performed in order to learn how the surface pressure affects the generation of noise is explained.

In the tests, by adjusting the tightening force of the nut 24, the average value of the surface pressure at the area of contact between both end surfaces was changed to be 1.0×10$^8$ [Pa], 1.5×10$^8$ [Pa], 2.0×10$^8$ [Pa] and 2.5×10$^8$ [Pa], and noise was generated at the area of contact for all four cases by repeatedly applying a torque in both directions to the outer ring 14 of the constant-velocity joint. The generated noise was listened to by ear and the level of the noise was determined. The results are shown in Table 1 below. In Table 1, the 'O' mark indicates that the level of the noise was low and hardly noticeable, the 'X' mark indicates that the level of the noise was high and very noticeable, and the 'Δ' indicates that the level of the noise level was in between the levels indicated by the 'O' mark and 'X' mark.

TABLE 1

| Average Surface Pressure [Pa] at Area of Contact | Noise Condition |
| --- | --- |
| 2.5 × 10$^8$ | X |
| 2.0 × 10$^8$ | X |
| 1.5 × 10$^8$ | Δ |
| 1.0 × 10$^8$ | O |

As can be clearly seen from Table 1, by keeping the average surface pressure at the area of contact between both end surfaces at 1.5×10$^8$ [Pa] or less, it is possible to reduce to a certain extent the unpleasant rubbing noise of squeal that occurs during operation, and by further keeping it at 1.0×10$^8$ [Pa] or less, it is possible to keep that noise at a low level that is hardly noticeable.

In order to keep the average surface pressure low, it is necessary to keep the tightening force of the nut 24 low, and, in the case of this invention, the inner race 5 is retained by the crimped section 30, so that there is no decreasing or loosening of the pre-load applied to the rolling elements 6 even when the tightening force is kept low.

Moreover, in order to suppress the generation of the aforementioned noise, it is possible to regulate the maximum value of the tightening force of the nut 24, however, from the aspect of suppressing the generation of the noise, it is not necessary to regulate the minimum value of this tightening force. However, this minimum value is regulated from the fact that relative displacement in the axial direction between the drive-shaft member 18 and the hub 4 is controlled so that it does not occur regardless of the thrust load applied to the drive-shaft member 18 during operation. In other words, during operation, a force in the direction that would cause relative displacement in the axial direction between the drive-shaft member 18 and the hub 4 is applied by the axial force that is generated in the tripod-type constant-velocity joint on the differential gear side, and further by the centrifugal force that occurs during revolution. Since both the drive-shaft member 18 and hub 4 are controlled such that they do not shift regardless of this kind of force, the minimum value of the tightening force of the nut 24 is maintained at about 3.5 KN, including the safety factor.

Figure 5:
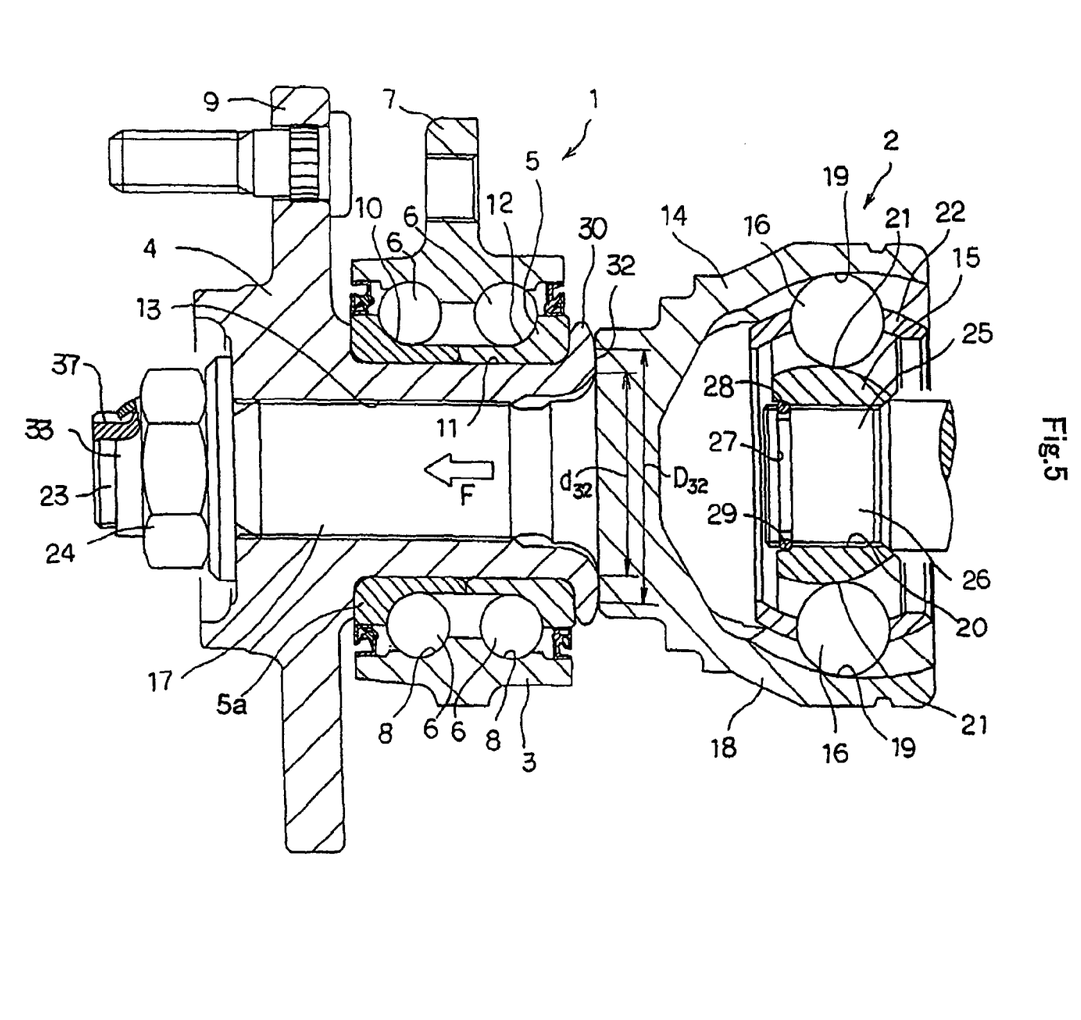
FIG. 5 is a cross sectional view to show a second example of the embodiment of the present invention.

Next, FIG. 5 shows a second example of the first embodiment of the present invention. This example differs from the first example described above in that there are no special notches 34 (see FIG. 3) formed on the cylindrical section 33 that is formed on the surface on the outside end of the nut 24. Instead, in this example, a concave groove 37 is formed partially around in the circumferential direction on the outer half of the male screw section 23 that is formed on the outside end of the spline shaft 17. In the case of this example, when the nut 24 has been tightened by a specified amount, the part of the cylindrical section 33 that matches with the concave groove 37 is plastically deformed inward (crimped) in the radial direction and made to be fitted in this concave groove 37 in an interlocking manner in order to prevent the nut 24 from becoming loose. Also, in this example, a pair of inner races 5, 5a are fitted around the hub 4, to form a first inner-ring raceway 10 and second inner-ring raceway 12.

In the case of this example as well, the tightening force of the nut 24 is regulated by the relationship with the surface area S of the flat surface 32 that is formed on the surface on the inside end of the crimped section 30 such that the average value of the surface pressure of the contact area between the flat surface 32 and the surface on the outside end of the outer ring 14 of the constant-velocity joint is 1.5×10$^8$ Pa ($\approx$15 kgf/mm$^2$) or less. In this example, the outer diameter $D_{32}$ of this flat surface 32 is 53 mm, and the inner diameter $d_{32}$ is 50 mm, and the tightening force of the nut 24 is controlled such that the axial force F that is applied to the spline shaft 17 when the nut 24 is tightened is 20 KN ($\approx$2 tf) or less.

Under the conditions above, the average value of the surface pressure $P_{av}$ at the area of contact between the surfaces of both ends is found as follows.

$$P_{av} = F/S = (20 \times 10^3)/\{\pi(0.053^2 - 0.050^2)/4\}$$
$$\approx 0.8 \times 10^8 \text{ [Pa]}$$

In this way, in this example as well, the surface pressure at the contact area between both end surfaces is kept at 1.5×10$^8$ Pa or less, so it is possible to suppress the unpleasant rubbing noise of squeal that occurs at this area of contact during operation. The other construction and functions are the same as those of the first example described above.

Figure 6:
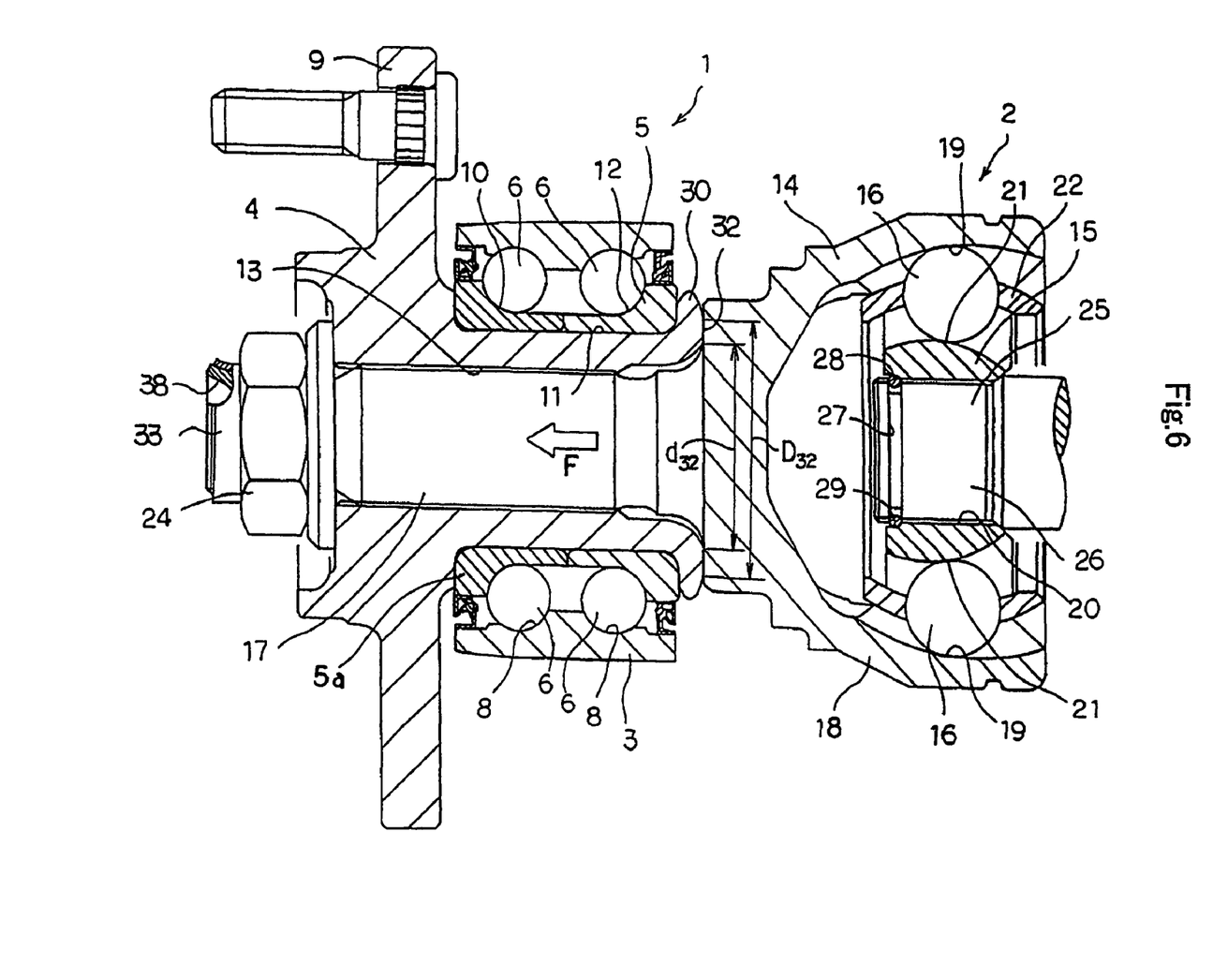
FIG. 6 is a cross sectional view to show a third example of the embodiment of the present invention.

Next, FIG. 6 shows a third example of the first embodiment of the present invention. This example differs from the first example described above in that there are no special notches 34 (see FIG. 3) formed on the cylindrical section 33 that is formed on the surface on the outside end of the nut 24. Instead, in this example, a concave section 38 is formed on the surface on the outside end of the spline shaft 17, and the outside end of this spline shaft 17 is formed into a cylindrical shape. In the case of this example, when the nut 24 is tightened by a specified amount, part of the section in the circumferential direction around the outside end of the spline shaft 17 is plastically deformed (crimped) outward in the radial direction together with the cylindrical section 33 to be fitted with the cylindrical section and to prevent the nut 24 from becoming loose.

In the case of this example as well, the tightening force of the nut 24 is regulated by the relationship with the surface area S of the flat surface 32 that is formed on the surface on the inside end of the crimped section 30 such that the average value of the surface pressure of the contact area between the flat surface 32 and the surface on the outside end of the outer ring 14 of the constant-velocity joint is $1.5 \times 10^8$ Pa ($\approx 15$ kgf/mm$^2$) or less. In this example, the outer diameter $D_{32}$ of this flat surface 32 is 50 mm, and the inner diameter $d_{32}$ is 46 mm, and the tightening force of the nut 24 is controlled such that the axial force F that is applied to the spline shaft 17 when the nut 24 is tightened is 30 KN ($\approx 3$ tf) or less.

Under the conditions above, the average value of the surface pressure $P_{av}$ at the area of contact between the surfaces of both ends is found as follows.

$$P_{av} = F/S = (30 \times 10^3)/\{\pi(0.050^2 - 0.046^2)/4\}$$
$$\approx 1.0 \times 10^8 \text{ [Pa]}$$

In this way, in this example as well, the surface pressure at the contact area between both end surfaces is kept at $1.5 \times 10^8$ Pa or less, so it is possible to suppress the unpleasant rubbing noise of squeal that occurs at this area of contact during operation. The other construction and-functions are the same as those of the second example described above.

Figure 7:
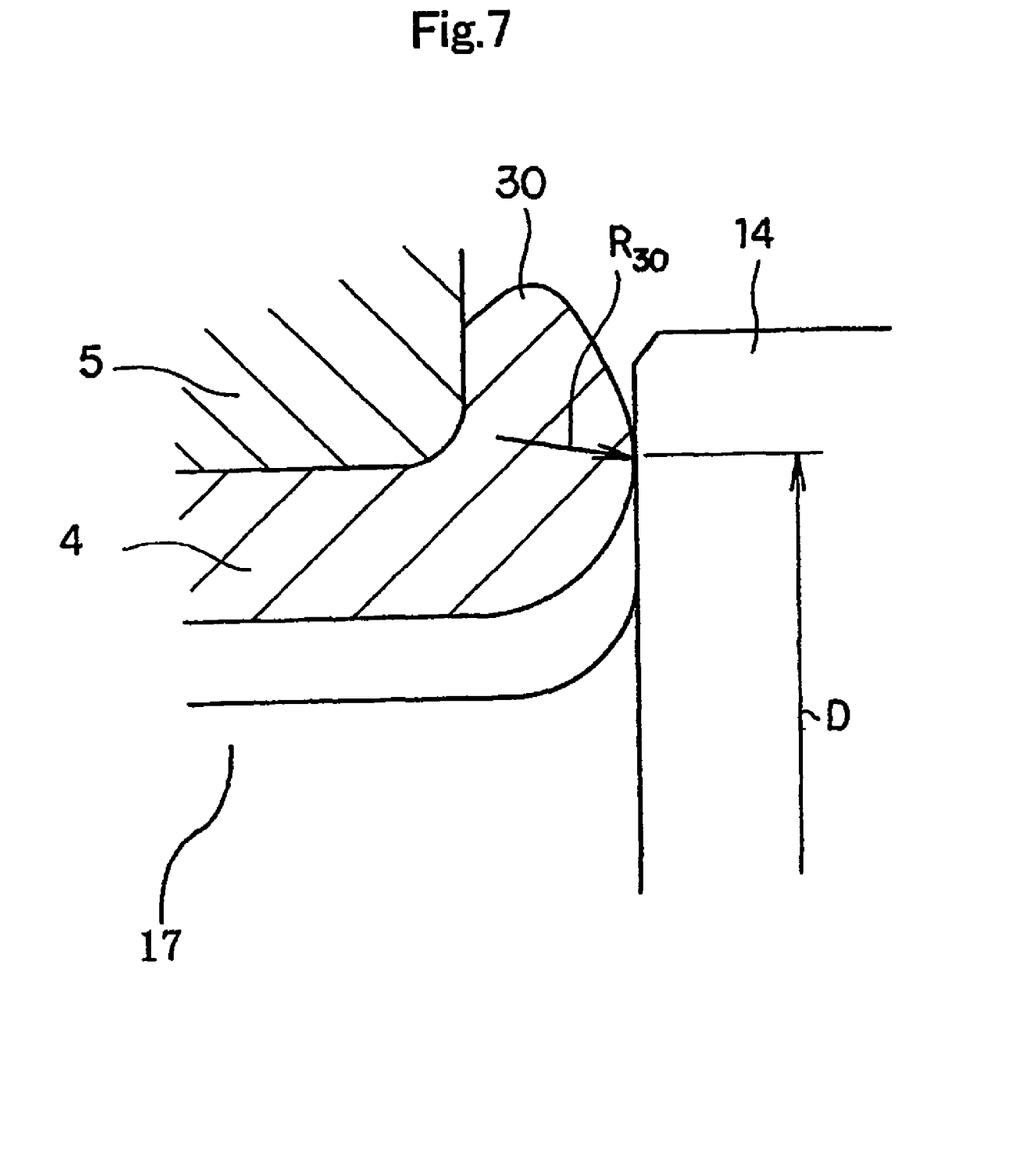
FIG. 7 is a view of Portion VII in FIG. 8 to explain the operation of the present invention.
Figure 8:
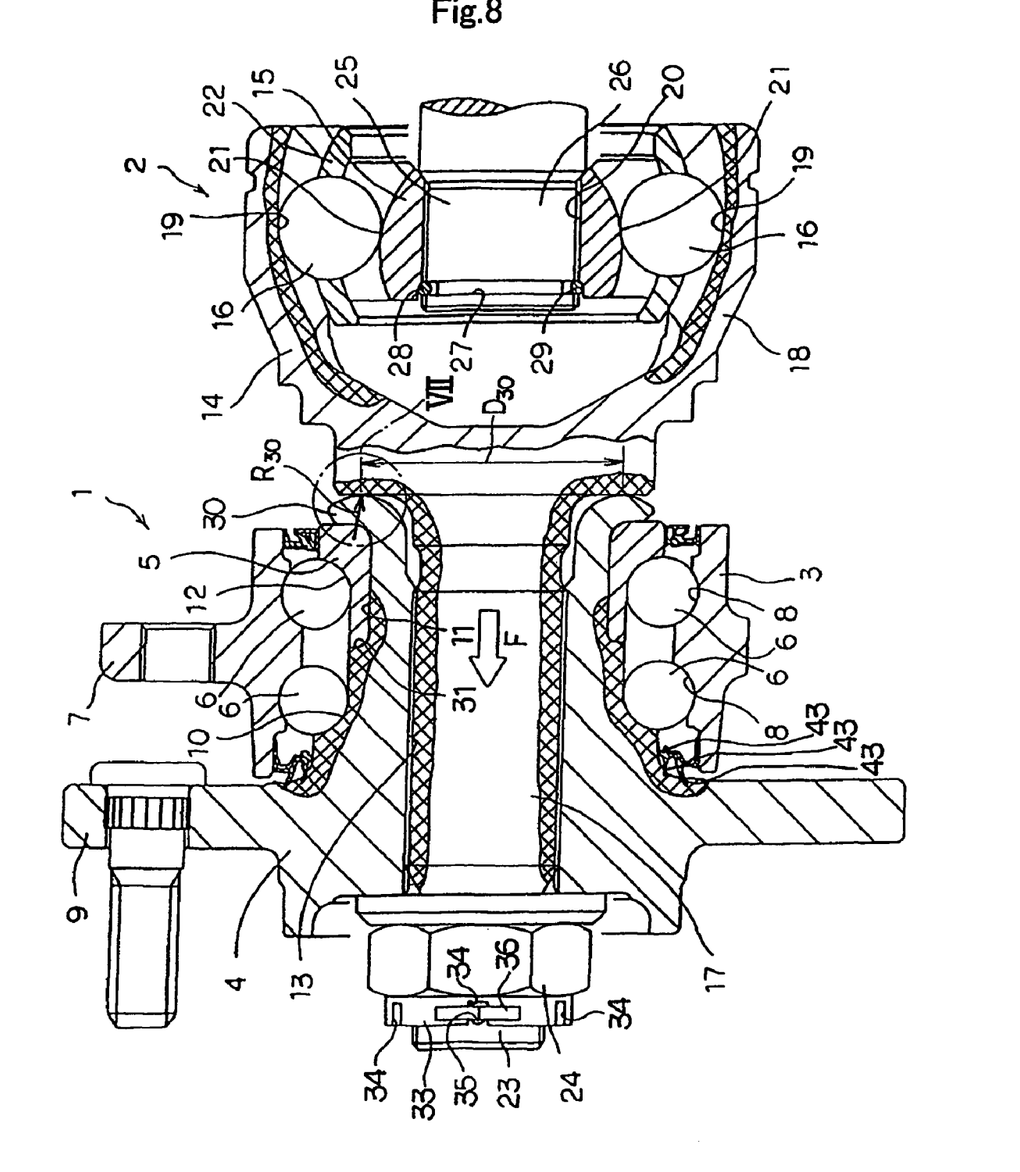
FIG. 8 is a cross sectional view of a fourth example of the embodiment of the present invention.

FIGS. 7 and 8 show a fourth example of a second embodiment of the present invention, wherein FIG. 7 shows part of FIG. 8. The feature of the invention described below is that the inner race 5, which is fitted over the small-diameter stepped section 11 that is formed on inside end of the hub 4, is fastened to this small-diameter stepped section 11 by a crimped section 30 that is formed on the inside end of the hub 4, and a suitable pre-load is applied to the rolling elements 6, and the cross-sectional shape of the crimped section 30 is arc shaped with no plastic deformation of the contact area between the inside end of the crimped section 30 and the surface on the outside end of the outer ring 14 of the constant-velocity joint.

The construction of the fastening section of the inner race 5 is the same as that of the second example of prior art construction shown in FIG. 2, and the construction of the other sections is the same as that of the first example of prior art construction shown in FIG. 1, so this explanation will center only on the features of this invention and the sections that are different from the prior art construction described above.

The hub 4 is made of carbon steel, specifically annealed S53C. As shown by the diagonal grid hatching shown in FIG. 8, of the outer peripheral surface in the center of the hub 4, the section that comes in sliding contact with the seal lip 43 on the base section of a second flange 9, the section of the first inner-ring raceway 10, and the section that extends from the outer half of the small-diameter stepped section 11 around which the inner race 5 is fitted, to the stepped surface 31, are quenched by heat treatment such as induction-hardening.

Of these, in order to improve the yield strength against moment loads applied to the second flange 9, and to improve the resistance to friction wear due to rubbing with the seal lip 43, the base of the second flange 9 is hardened by quenching. Also, the section of the first inner-ring raceway 10 is hardened by quenching in order to secure its rolling fatigue life.

In addition, the section that extends from the outer half of the small-diameter stepped section 11 to the step surface 31 is quench-hardened in order that there is no plastic deformation even when a load is applied to the inner race 5 that is fitted around the outside of the small-diameter stepped section 11.

On the other hand, the section formed with the crimped section 30 on the inside end of the hub 4 is not quench-hardened but left pliable as is. The hardness of the cylindrical section on this inside end before the crimped section is formed is about Hv 220 to 280. In contrast to this, after the crimped section 30 has been formed by cold forging, the hardness of the surface of the crimped section 30 is about Hv 320 due to work hardening.

As described above, in the case of this invention, the flat surface 32 as in the case of the second example of prior art construction shown in FIG. 2 is not formed on the inside end surface of the crimped section 30, but the cross-sectional shape of this surface on the inside end has a convex circular arc shape. In this embodiment, the radius of curvature $R_{30}$ of the cross-sectional shape of the section of the inside end of the crimped section 30 that comes in contact with the surface on the outside end of the outer ring 14 of the constant-velocity joint described later, is 5.5 mm. Also, the radius of curvature of the corner R portions formed on the inner peripheral edge on the inside end surface of the inner race 5 is normally about 2 to 6 mm, however, in this embodiment it is 4 mm.

Moreover, the drive-shaft member 18, which is connected to the hub 4 by the nut 24, is also made of carbon steel, and the areas indicated by the diagonal grid hatching in FIG. 8 are hardened by quenching. Specifically, the surface on the outside end of the outer ring 14 of the constant-velocity joint, and the section that extends from the base of the spline shaft 17 to a portion of the center near the tip end, are quench-hardened by heat treatment such as induction hardening, to increase the strength of the base end of the spline shaft 17.

For the reason previously described, it is difficult to increase the surface hardness of the surface on the inside end of the crimped section 30, however, it is easy to harden the surface on the outside end of the outer ring 14 of the constant-velocity joint. By quenching the surface on this outside end, it is possible to increase the strength of the aforementioned base section, as well as make plastic deformation of this outside end surface more difficult. On the other hand, as described later, it is possible to prevent plastic deformation of the surface on the inside end of the crimped section 30 by regulating the tightening force of the nut 24.

Similar to the embodiment shown in FIG. 3, this embodiment comprises a male screw section 23, cylindrical section 33, notches 34, and through hole 35. In regards to these, the previous description of FIG. 3 is referenced.

It is preferable that a thin screw e.g. with a pitch of about 1 mm be used where the amount that the axial force of the nut 24 is increased per rotation angle is small, so that the tightening axial force is kept within the allowable range set (between the upper and lower limits) at a position where the notches 34 match with the through-hole 35.

Without forming a through-hole 35 beforehand, it is possible to tighten the nut 24 by a specified amount first, and then to form a through-hole in the outside end of the spline shaft 17 in the section in alignment with a pair of suitable notches 34 that can be selected for easy work, and finally a cotter pin 36 can then be inserted through that through-hole.

Furthermore, without forming notches in the cylindrical section 33 of the outside end of the nut 24, it is possible to tighten the nut 24 by a specified amount first, and then to form a through-hole at a suitable location that can be selected for easy work that penetrates through both the cylindrical section 33 and the outside end of the spline 17 in alignment, and finally a cotter pin 36 can then be inserted through that through-hole.

In either of these cases, instead of the somewhat troublesome work of forming the through-hole, it is possible to more finely adjust the amount of tightening of the nut 24 than in the case of inserting the cotter pin 36 through the pre-formed notches 34 and through-hole 35.

In either case, the tightening force (tightening torque) of the nut 24 is regulated such that the load per unit length $F/L_a$ at the area of contact between the surface on the inside end of the crimped section 30 and the surface on the outside end of the outer ring 14 of the constant-velocity joint is 125 N/mm or less. In this example, the diameter of the area of contact, or in other words, the diameter $D_{30}$ of the section where the surface on the inside end of the crimped section 30 protrudes inward the most in the axial direction, is 50 mm, and the tightening force of the nut 24 is regulated such that the axial force F that is applied to the spline shaft 17 when the nut 24 is tightened is 15,000 N or less.

Under these conditions, the load per unit length $F/L_a$ is found as shown below.

$F/L_a = 15,000/(50\pi) \approx 99.5$ [N/mm]

In the case of this example, the load per unit length $F/L_a$ at the area of contact between both end surfaces is kept at 125 N/mm or less, so it is possible to prevent plastic deformation of the surface on the inside end of the crimped section 30 and the surface on the outside end of the outer ring 14 of the constant-velocity joint. Particularly, in this example, the radius of curvature $R_{30}$ of the cross-sectional shape of the crimped section 30 is 5.5 mm, which is greater than the value for the radius of curvature $R_{30}$ (5 mm) found to meet the conditions $F/L_a \leq 125$ N/mm, so that it is possible to adequately prevent the aforementioned plastic deformation.

In order to keep the load per unit length $F/L_a$ low, it is necessary to keep the tightening force of the nut 24 low, however, in this invention, the inner race 5 is retained by the crimped section 30, so that there is no decreasing or loosening in the pre-load applied to the rolling elements 6 even when the tightening force is kept low.

Moreover, in order to prevent plastic deformation of the surface on the inside end of the crimped section 30 and the surface on the outside end of the outer ring 14 of the constant-velocity joint, it is possible to regulate the maximum value of the tightening force of the nut 24, however, from the aspect of suppressing the aforementioned plastic deformation, it is not necessary to regulate the minimum value of this tightening force. However, this minimum value is regulated from the fact that relative displacement in the axial direction between the drive-shaft member 18 and the hub 4 is controlled so that it does not occur regardless of the thrust load applied to the drive-shaft member 18 during operation. In other words, during operation, a force in the direction that would cause relative displacement in the axial direction between the drive-shaft member 18 and the hub 4 is applied by the axial force that is generated in the tripod-type constant-velocity joint on the differential gear side, and further by the centrifugal force that occurs during turning. Since both the drive-shaft member 18 and hub 4 are controlled such that they do not shift regardless of this kind of force, the minimum value of the tightening force of the nut 24 is maintained at about 3,500 N, including the safety factor. Also, the lower limit is not regulated by the aforementioned load per unit length F/La, but is regulated by the force F in the axial direction.

Figure 9:
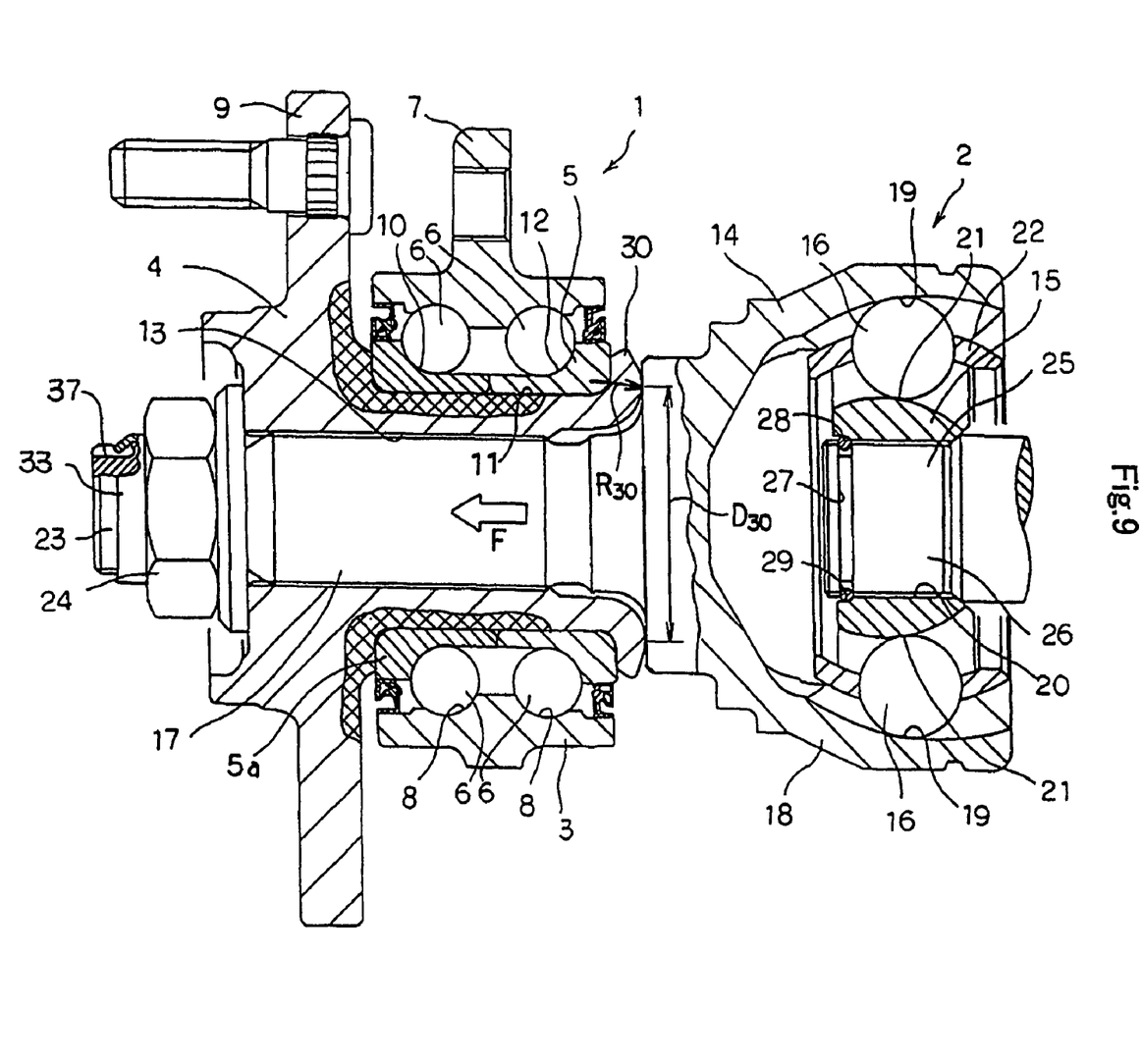
FIG. 9 is a cross sectional view of a fifth example of the embodiment of the present invention.

Next, FIG. 9 shows a fifth example of the second embodiment of the invention. This example differs from the fourth example described above in that no special notches 34 (see FIG. 8) formed in the cylindrical section 33 that is formed on the outside end of the nut 24. Instead, in this example, a concave groove 37 is formed partially around in the circumferential direction on the outer half of the male screw section 23 that is formed on the outside end of the spline shaft 17. In the case of this example, when the nut 24 has been tightened by a specified amount, the part of the cylindrical section 33 that matches with the concave groove 37 is plastically deformed inward (crimped) in the radial direction and made to be engaged with this concave groove 37 in an interlocking manner in order to prevent the nut 24 from becoming loose.

Also, in this example, a pair of inner races 5, 5a are fitted around the hub 4, to form a first inner-ring raceway 10 and second inner-ring raceway 12. In addition, in this example, it is not necessary to maintain the hardness of the hub 4 at the level required for the inner-ring raceways. Therefore, in this example, the hub 4 is made of carbon steel S50C. Also, as shown by the diagonal grid hatching in FIG. 9, of the outer peripheral surface of the hub 4, the section extending from the base of the second flange 9 to the section over which the pair of inner races 5, 5a are fitted are hardened by quenching.

In the case of this example as well, the tightening force of the nut 24 is regulated such that the force per unit length $F/L_a$ at the area of contact between the surface on the inside end of the crimped section 30 and the surface on the outside end of the outer ring 14 of the constant-velocity joint is 125 N/mm or less. In this example, the diameter of the area of contact, or in other words, the diameter $D_{30}$ of the portion of the inside end surface of the crimped section 30 which protrudes inward the most in the axial direction, is 47 mm, and the tightening force of the nut 24 is regulated such that the axial force F that is applied to the spline shaft 17 when the nut 24 is tightened is 18,000 N or less.

Under these conditions, the load per unit length $F/L_a$ is found as shown below.

$F/L_a = 18,000/(47\pi) \approx 122.0$ [N/mm]

In this example, the load per unit length $F/L_a$ of the area of contact between both end surfaces is kept at 125 N/mm or less, so that it is possible to prevent plastic deformation of the surface on the inside end of the crimped section 30 and the surface on the outside end of the outer ring 14 of the constant-velocity joint.

Particularly, in this example, the radius of curvature $R_{30}$ of the cross-sectional shape of the crimped section 30 is 6.0 mm, which is greater than the value for the radius of curvature $R_{30}$ (5 mm) found to meet the conditions $F/L_a \leq 125$ N/mm, so that it is possible to adequately prevent the aforementioned plastic deformation. The other construction and functions are the same as those of the fourth example described above.

Figure 10:
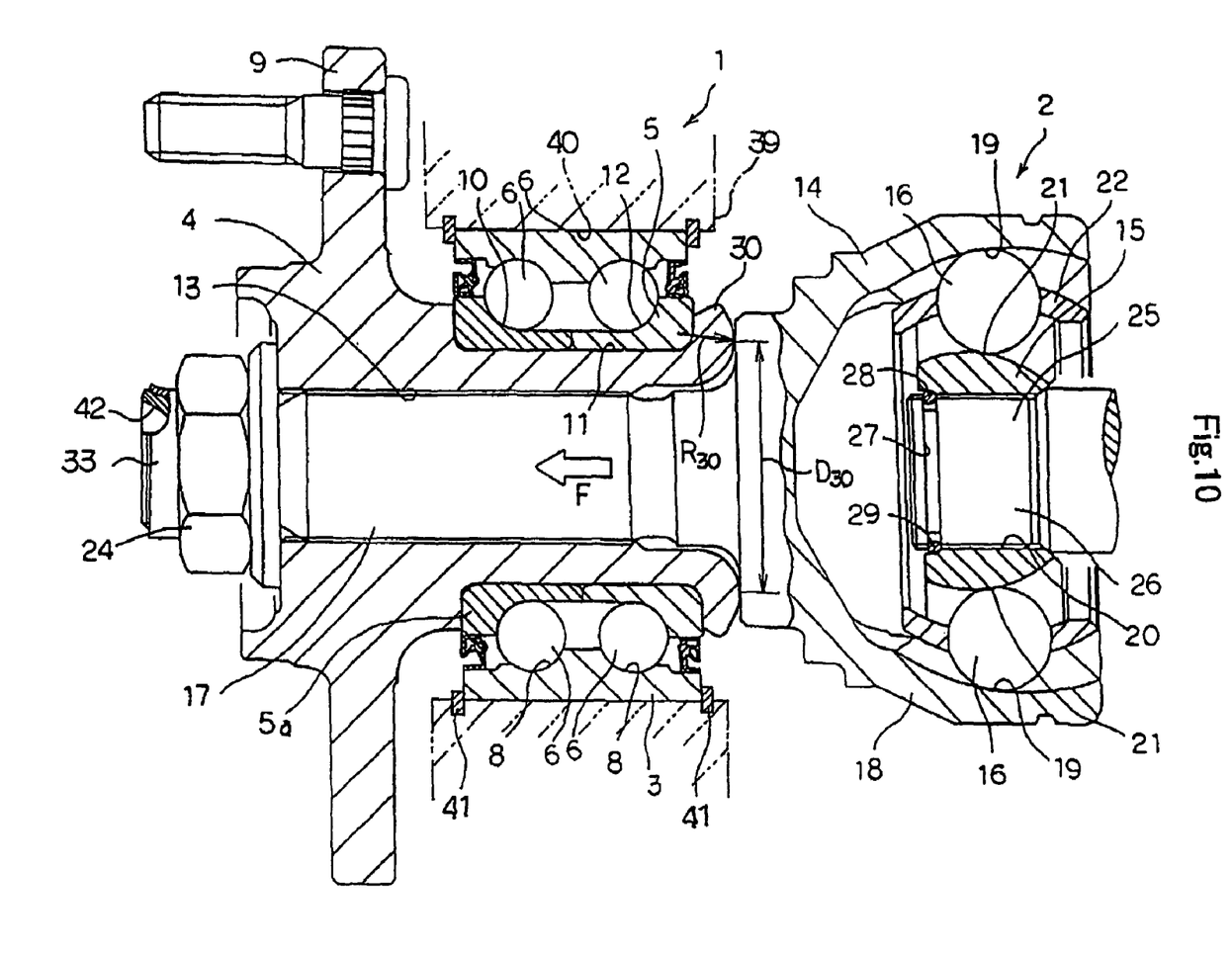
FIG. 10 is a cross sectional view of a sixth example of the embodiment of the present invention.

Next, FIG. 10 shows the sixth example of the second embodiment of the invention. This example differs from the fourth example or fifth example in that the first flange 7 (see FIGS. 8, 9) is not formed around the outer peripheral surface of the outer race 3, but rather this outer peripheral surface is just a cylindrical surface. Also, an installation hole 40 is formed in the knuckle 39 of the suspension, and the outer race 3 is fitted inside the installation hole 40 and prevented from coming out of this installation hole 40 by a pair of snap rings fitted around the inner peripheral surface on both ends of the installation hole 40. Moreover, this example also differs from the fourth example described above in that the notches 34 (see FIG. 8) are not formed in the cylindrical section 33 that is formed on the outside end surface of the nut 24. Instead, a concave section 42 is formed on the outside end surface of the spline shaft 17 and the outside end of the spline shaft 17 is formed into a cylindrical shape.

In the case of this example, when the nut 24 is tightened by a specified amount, part in the circumferential direction of the outside end of the spline shaft 17 plastically deforms (is crimped) outward in the radial direction together with the cylindrical section 33 to be fitted with the cylindrical section 33 in an interlocking manner and to prevent the nut 24 from becoming loose.

In the case of this example as well, the tightening force of the nut 24 is regulated such that the force per unit length $F/L_a$ at the area of contact between the surface on the inside end of the crimped section 30 and the surface on the outside end of the outer ring 14 of the constant-velocity joint is 125 N/mm or less. In this example, the diameter of the area of contact, or in other words, the diameter $D_{30}$ of the portion of the inside end surface of the crimped section 30 which protrudes inward the most in the axial direction, is 45 mm, and the tightening force of the nut 24 is regulated such that the axial force F that is applied to the spline shaft 17 when the nut 24 is tightened is 16,000 N or less.

Under these conditions, the load per unit length $F/L_a$ is found as shown below.

$$F/L_a = 16,000/(45\pi) \approx 113.2 \text{ [N/mm]}$$

In this example, the load per unit length $F/L_a$ of the area of contact between both end surfaces is kept at 125 N/mm or less, so that it is possible to prevent plastic deformation of the surface on the inside end of the crimped section 30 and the surface on the outside end of the outer ring 14 of the constant-velocity joint. Particularly, in this example, the radius of curvature $R_{30}$ of the cross-sectional shape of the crimped section 30 is 6.5 mm, which is greater than the value for the radius of curvature $R_{30}$ (5 mm) found to meet the conditions $F/L_a \leq 125$ N/mm, so that it is possible to adequately prevent the aforementioned plastic deformation. The other construction and functions are the same as those of the fourth and fifth examples described above.

In all of the examples of the preferred embodiments described above, ball were used for the rolling elements 6, however, in the case of a bearing unit for wheel drive of a heavy vehicle, tapered rollers may be used for the rolling elements. Of course, construction that uses tapered rollers for the rolling elements is within the technical scope of this invention.

Also, in the case of construction where a flat surface 32 is formed on the surface on the inside end of the crimped section 30 as shown in FIG. 2, it is possible to make the load per unit length $F/L_a$ at the area of contact between the surface on the inside end of the crimped section 30 and the surface on the outside end of the outer ring 14 of the constant-velocity joint far greater than 125 N/mm. In this case, making the average value of the surface pressure at the area of contact between the surface on the inside end of the crimped section 30 and the surface on the outside end of the outer ring 14 of the constant-velocity joint $1.5 \times 10^8$ Pa or less, is as described previously for the first embodiment. In this case the maximum value for the load per unit length $F/L_a$ is found under the conditions when the surface pressure at the area of contact is 950 Mpa as described previously with respect to Equation 2.

APPLICABILITY TO THE INDUSTRY

This invention, which is constructed and functions as described above, provides a bearing unit for wheel drive that makes it possible to adequately apply a pre-load to the rolling elements, as well as suppress over a long period of time unpleasant noise that is generated during operation. Moreover, this invention provides a low-cost bearing unit for wheel drive that makes it possible to adequately apply a pre-load to the rolling elements, as well as prevents play that occurs due to plastic deformation.

The invention claimed is:

1. A bearing unit for wheel drive comprising: a drive shaft member having an inside half on which an outer ring of a constant-velocity joint is formed, and an outside half on which a spline shaft is formed; a hub having a radially center portion formed with a spline hole in which the spline shaft is fitted, so as to be rotated and driven via the constant-velocity joint during use; the hub having at an out side end thereof a peripheral surface formed with a flange for supporting and fastening a wheel to the hub; and at an inside end a small-diameter stepped section such that the dimension of the outer diameter of the stepped section is smaller than the section that is formed with the first inner-ring raceway; an inner race having an outer peripheral surface formed with a second inner-ring raceway and fitted around the small-diameter stepped section; the hub having at an intermediate portion a peripheral surface provided with a first inner-ring raceway that is formed directly around the outer peripheral surface or by way of another inner race that is separate from the hub; an outer race having an inner peripheral surface formed with a pair of outer-ring raceways to face the first and second inner-ring raceways, and being not rotated even during use; and a plurality of rolling elements that are located between each of the outer-ring raceways and the first and second inner-ring raceways, the inside end of the hub formed with a cylindrical section that protrudes further inward than the inner race that is fitted around the small-diameter stepped section, the cylindrical section being crimped outward in the radial direction to form a crimped section, such that this crimped section retains the inner race against the step surface of small-diameter stepped section, and the inner race being fastened to the hub with a pre-load applied to the rolling elements, a nut being screwed onto the tip end of the drive-shaft member and provided with an inside end, the hub being connected and fixed to the drive shaft member by tightening the nut with the surface on the outside end of the hub in contact with the surface of the inside end of the nut, and with the surface on the inside end of the crimped section in contact with the surface on the outside end of the outer ring of the constant-velocity joint, wherein the average value of the surface pressure at the area of contact between the surface on the inside end of the crimped portion and the surface on the outside end of the outer ring of the constant-velocity joint is up to $1.5 \times 10^8$ Pa.

* * * * *